United States Patent
Szita et al.

(10) Patent No.: US 9,691,421 B2
(45) Date of Patent: Jun. 27, 2017

(54) WRITING SPIRALS WITH ACCURATE SLOPE ON A DISK DRIVE MEDIA

(71) Applicant: KABUSHIKI KAISHA TOSHIBA, Tokyo (JP)

(72) Inventors: Gabor Szita, Mountain View, CA (US); Jiangang Liang, San Jose, CA (US); Li Zhang, Fremont, CA (US); Gary W. Calfee, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 14/675,458

(22) Filed: Mar. 31, 2015

(65) Prior Publication Data

US 2016/0293191 A1    Oct. 6, 2016

(51) Int. Cl.
*G11B 5/596*    (2006.01)
*G11B 5/55*    (2006.01)

(52) U.S. Cl.
CPC ........ *G11B 5/59666* (2013.01); *G11B 5/5543* (2013.01); *G11B 5/59661* (2013.01)

(58) Field of Classification Search
CPC ............ G11B 5/59633–5/59638; G11B 5/5965–5/59666; G11B 2020/1281–2020/1284
USPC ...... 360/48–49, 51, 55, 69, 75, 78.04–78.09
See application file for complete search history.

(56) References Cited

U.S. PATENT DOCUMENTS

| | | | | |
|---|---|---|---|---|
| 5,668,679 A * | 9/1997 | Swearingen | ....... | G11B 5/59661 360/75 |
| 6,992,852 B1 * | 1/2006 | Ying | .................. | G11B 5/59661 360/75 |
| 7,414,809 B2 * | 8/2008 | Smith | ................ | G11B 5/59633 360/77.08 |
| 7,529,055 B1 | 5/2009 | Laks et al. | | |
| 7,619,846 B2 * | 11/2009 | Shepherd | ........... | G11B 5/59644 360/75 |
| 7,995,305 B1 * | 8/2011 | Ton-That | ............. | G11B 5/5534 360/75 |
| 8,493,684 B1 * | 7/2013 | Ton-That | ............. | G11B 5/5534 360/75 |
| 8,634,154 B1 | 1/2014 | Rigney et al. | | |
| 8,941,939 B1 * | 1/2015 | Rigney | ................ | G11B 5/5547 360/55 |
| 2007/0211369 A1 | 9/2007 | Yang et al. | | |

(Continued)

*Primary Examiner* — Wayne Young
*Assistant Examiner* — James L Habermehl
(74) *Attorney, Agent, or Firm* — Patterson & Sheridan, LLP

(57) ABSTRACT

A reference spiral is written on a recording surface of a magnetic storage disk that is free of position or timing information. The reference spirals are written on the recording surface with a substantially uniform slope by using open loop control of the position of a read/write head in conjunction with an iterative learning control scheme. A voltage profile applied to a voice coil motor is adapted over multiple iterations of moving the read/write head across the recording surface to closely approximate a target voltage profile, and the reference spiral is written using the adapted voltage profile. In addition, ramp contact detection based on actuator current profile may be employed to achieve full utilization of available actuator stroke.

21 Claims, 9 Drawing Sheets

(56) References Cited

U.S. PATENT DOCUMENTS

2007/0291401 A1\* 12/2007 Sun .................. G11B 5/596
                                                    360/75
2011/0181977 A1    7/2011 Kim et al.

\* cited by examiner

WRITING SPIRALS WITH ACCURATE SLOPE ON A DISK DRIVE MEDIA

BACKGROUND

In a typical hard disk drive (HDD), servo sectors on the disk are used to provide position information about the location of a magnetic head over a disk surface. A common approach for writing such servo information on the disk is referred to as spiral-based self servo writing, or spiral-based SSW. According to this approach, spiral-shaped positioning signals (or "servo spirals") are written on the disk surface prior to the SSW process. During the SSW process, each magnetic head of the HDD is positioned relative to a disk surface based on the servo spirals, so that the final servo information on each disk surface can be written by the disk drive heads.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing. Accordingly, there is a need in the art for a method of generating servo spirals on a disk surface of an HDD without the use of external equipment.

SUMMARY

One or more embodiments provide systems and methods for in-drive writing of servo spirals on a disk surface of a hard disk drive. An iterative learning control scheme is applied to perform open-loop control on a magnetic head actuator in the hard disk drive to ensure uniform and constant spiral slope across the stroke of the actuator. In addition, ramp contact detection based on actuator current profile may be employed to achieve full utilization of available actuator stroke.

A method of writing a servo spiral on a recording surface of a magnetic storage disk, according to an embodiment, includes the steps of controlling a write head according to a first velocity profile using open-loop control to move the write head from an inner diameter of the recording surface to an outer diameter of the recording surface, measuring a second velocity profile of the write head while the write head is moved from the inner diameter to the outer diameter, adjusting control parameters of the open-loop control to move the write head from the inner diameter of the recording surface to the outer diameter of the recording surface according to the second velocity profile, and writing a servo spiral on the recording surface as the write head is moved from the inner diameter of the recording surface to the outer diameter of the recording surface according to the adjusted control parameters.

A data storage device, according to another embodiment, comprises a data storage disk with a recording surface and a controller. The controller is configured to, control a write head according to a first velocity profile using open-loop control to move the write head from an inner diameter of the recording surface to an outer diameter of the recording surface, measure a second velocity profile of the write head while the write head is moved from the inner diameter to the outer diameter, adjust control parameters of the open-loop control to move the write head from the inner diameter of the recording surface to the outer diameter of the recording surface according to the second velocity profile, and write a servo spiral on the recording surface as the write head is moved from the inner diameter of the recording surface to the outer diameter of the recording surface according to the adjusted control parameters.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
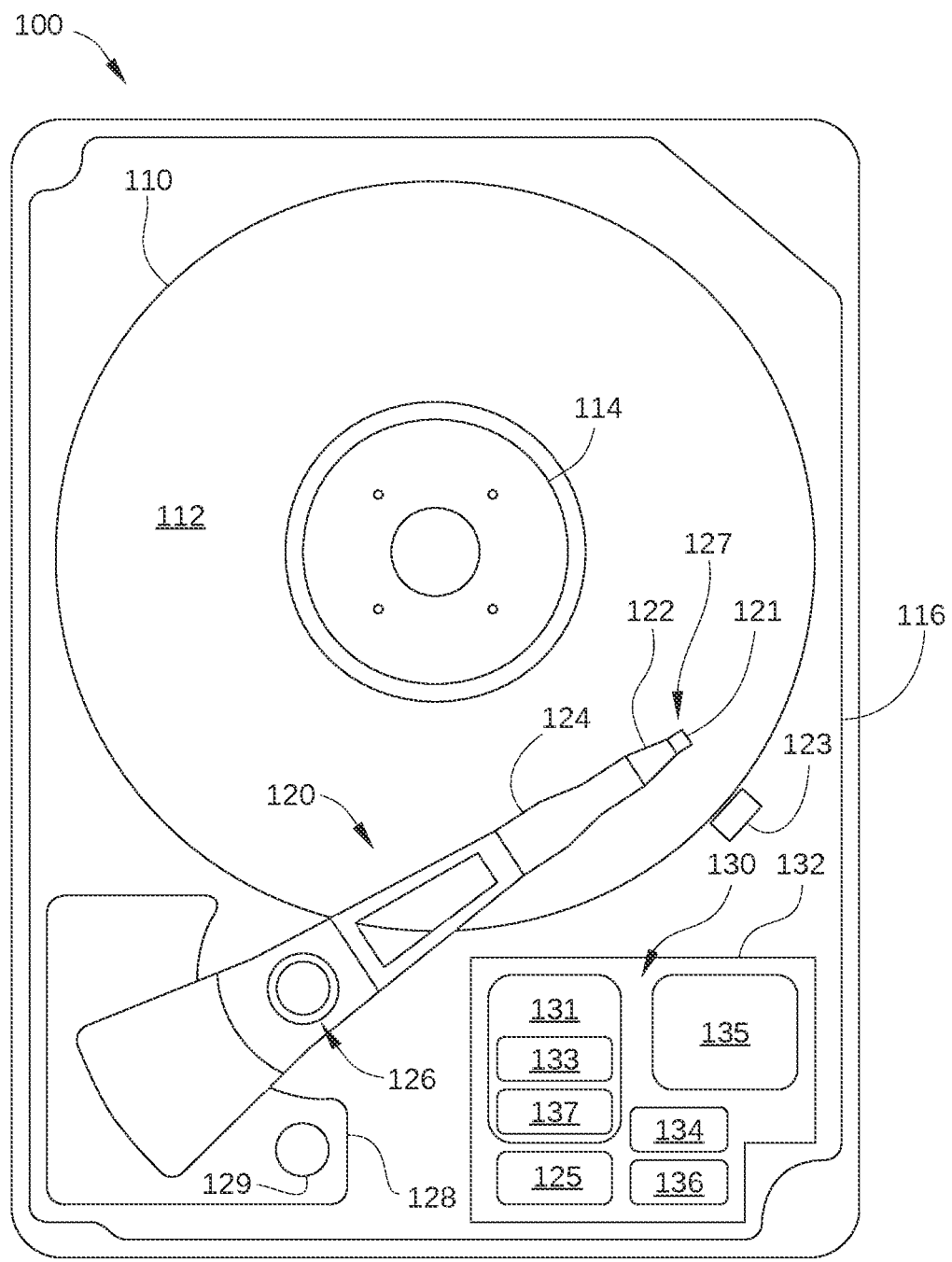
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes at least one storage disk 110 that is rotated by a spindle motor 114 and includes a plurality of concentric data storage tracks are disposed on a surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as a data buffer) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

HDD 100 also includes an inner diameter (ID) crash stop 129 and a load/unload ramp 123. ID crash stop 129 is configured to restrict motion of actuator arm assembly 120 to preclude damage to read/write head 127 and/or storage disk 110. Load/unload ramp 123 is typically disposed proximate the outer diameter (OD) of storage disk 110 and is configured to unload read/write head 127 from storage disk 110. Typically, at the beginning of a self servo writing (SSW) process, actuator arm assembly 120 is pushed against ID crash stop 129, so that ID crash stop 129 may serve as a position reference at the start of the SSW process.

For clarity, HDD 100 is illustrated with a single storage disk 110 and a single actuator arm assembly 120. HDD 100 may also include multiple storage disks and multiple actuator arm assemblies. In addition, each side of storage disk 110 may have a corresponding read/write head associated therewith and coupled to a flexure arm.

When data are transferred to or from storage disk 110, actuator arm assembly 120 sweeps an arc between the ID and the OD of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform SSW, position and timing information are provided to the disk drive servo system of HDD 100 so that HDD 100 can write servo wedges onto storage disk 110 with the necessary precision for proper operation of HDD 100. Servo wedges generally contain servo information that is located in servo sectors of the concentric data storage tracks on storage disk 110 and is read by the read/write head 127 during read and write operations to position the read/write head 127 above a desired data storage track. The position and timing information that enable the internal servo system of HDD 100 to perform SSW is typically in the form of reference spiral tracks or "servo spirals" written on storage disk 110. One embodiment of servo spirals is illustrated in FIG. 2.

Figure 2:
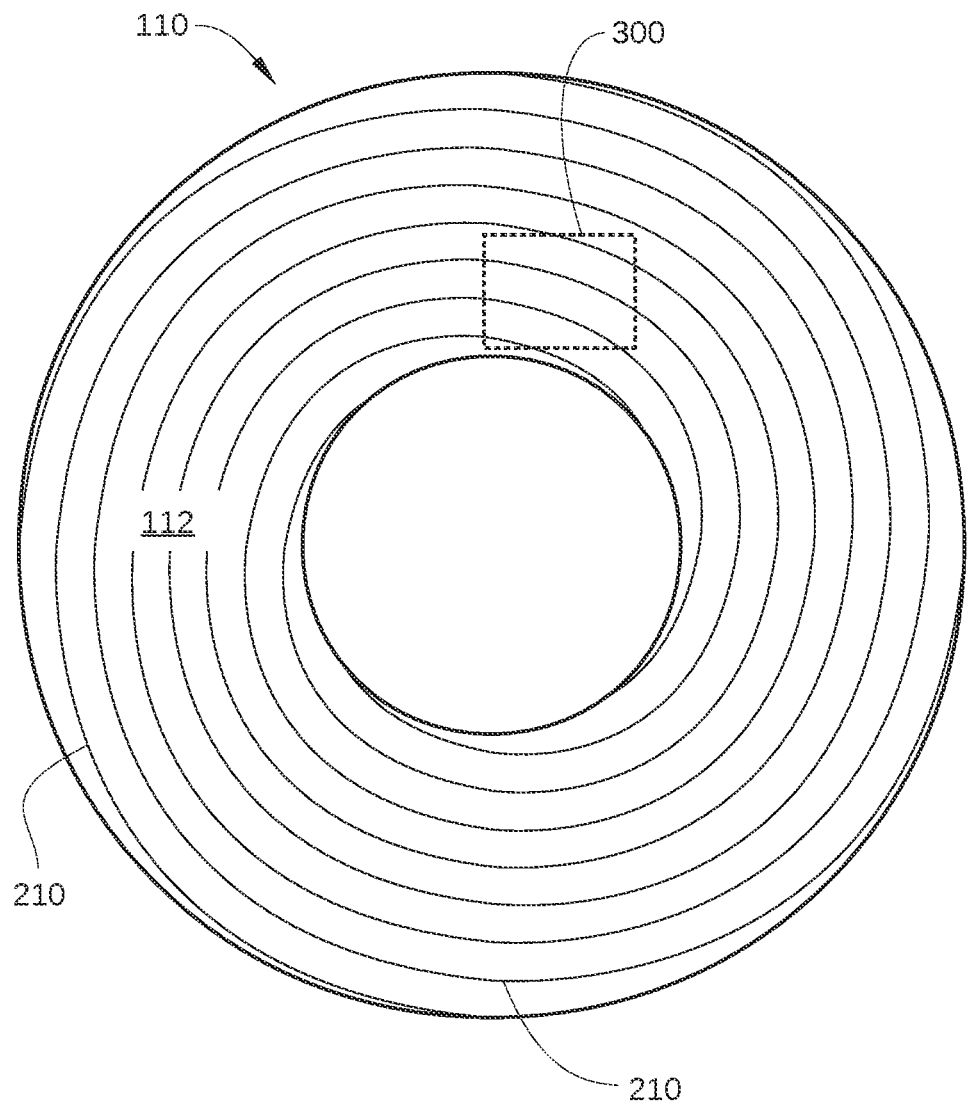
FIG. 2 illustrates a storage disk of the hard disk drive of FIG. 1 prior to undergoing a servo self-write process, according to one embodiment.

FIG. 2 illustrates storage disk 110 prior to undergoing a SSW process, according to one embodiment. As shown, storage disk 110 has a plurality of bootstrap spirals 210 written thereon that are circumferentially spaced from adjacent bootstrap spirals 210. In the embodiment illustrated in FIG. 2, bootstrap spirals 210 are servo spirals that are written onto a substantially blank surface 112 of storage disk 110 using read/write head 127 and the servo system of HDD 100. Because surface 112 does not include timing or position information when bootstrap spirals 210 are written onto surface 112, bootstrap spirals 210 are written with the servo system of HDD 100 using open-loop control, in which current position information is not fed back to the servo system of HDD 100.

According to some embodiments, bootstrap spirals 210 are employed as coarse guide spirals that enable the generation of fine guide spirals (not shown) using closed-loop control in the servo system of HDD 100. That is, fine guide spirals can be written while the servo system of HDD 100 uses closed-loop tracking of the coarse guide spirals. Fine guide spirals are more closely spaced and accurately positioned servo spirals than bootstrap spirals 210, and may be used for the SSW process or to generate a larger number of servo spirals (e.g., on the order of several hundred) that are used for the SSW process. It is noted that the number of bootstrap spirals 210 written on storage disk 110 prior to the SSW process may be larger than that shown in FIG. 2, for example 10, 20, 30, or more.

During the SSW process, the servo system of HDD 100 uses the timing and position information provided by the above-described fine guide spirals to servo precisely over a radial position on storage disk 110 corresponding to a particular concentric data storage track. Thus, while the read head of HDD 100 is used to read position and timing information from bootstrap spirals 210, the write head of HDD 100 is used to write servo wedges for the radial position on storage disk 110, i.e., for the particular data storage track of storage disk 110.

Figure 3:
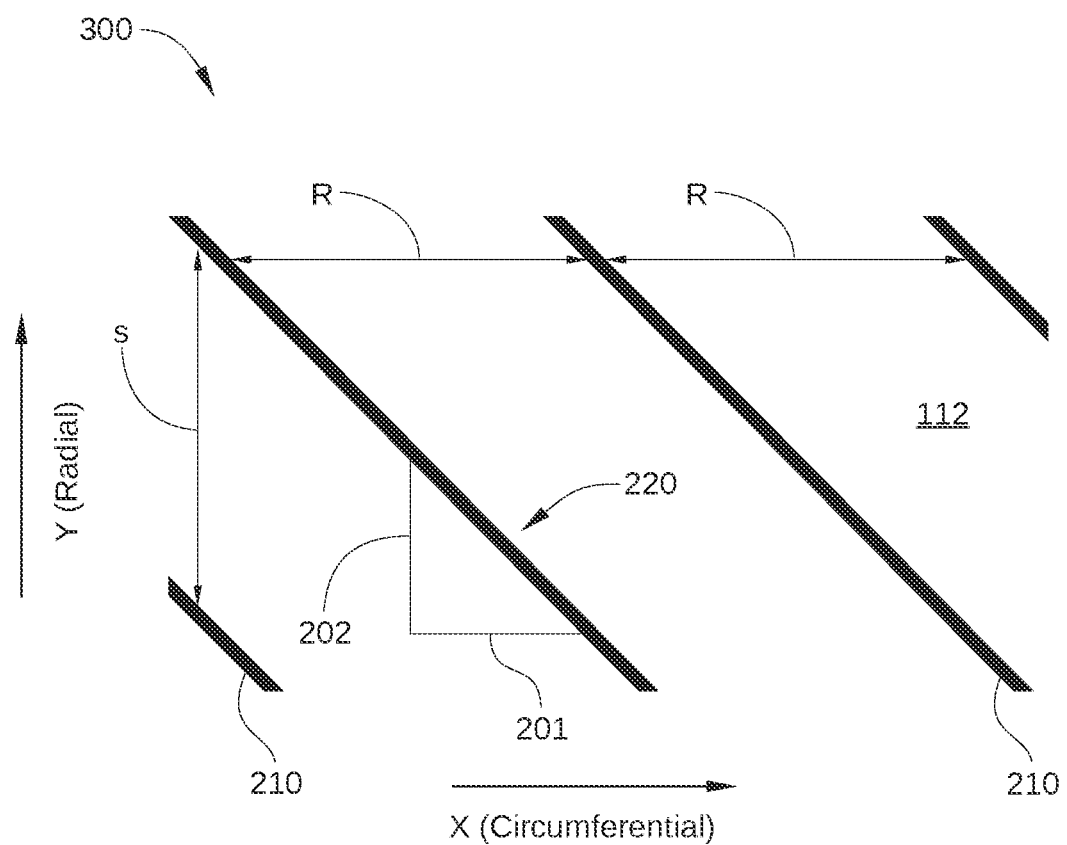
FIG. 3 is a schematic illustration of a portion of a storage disk indicated in FIG. 2 prior to undergoing a servo self-write process, according to one embodiment.

FIG. 3 is a schematic illustration of a portion 300 of storage disk 110 indicated in FIG. 2 prior to undergoing a SSW process. As shown, a plurality of bootstrap spirals 210 are formed on storage disk 110. Displacement along the x-axis in FIG. 3 is displayed in terms of angular displacement, such as radians or degrees. Consequently, in the ideal case in which each of bootstrap spirals 210 is written to storage disk 110 with the same constant and uniform slope 220, bootstrap spirals 210 can be assumed to be circumferentially separated from each other by a substantially uniform angular separation R at any radial location on storage disk 110, and bootstrap spirals 210 can be depicted as parallel lines in FIG. 3. Thus, assuming a constant rotational velocity for storage disk 110, when read/write head 127 is positioned at any particular radial location, a time required for read/write head 127 to travel from one to another of bootstrap spirals 210 is always a constant time interval.

In some embodiments, slope 220 at a specific location on or portion of bootstrap spiral 210 may be defined as the ratio of a circumferential angular displacement 201 to a radial linear displacement 202 of the bootstrap spiral 210 at the specific portion or location. In other embodiments, slope 220 at the specific location or portion may be defined as the ratio of radial linear displacement 202 to circumferential angular displacement 201. Furthermore, any other applicable definition of "slope" or "gradient" may be used to quantify slope 220 at a specific location on or portion of a bootstrap spiral 210.

According to some embodiments, bootstrap spirals 210 are written on surface 112 with a substantially uniform slope 220 by using open loop control of the position of read/write head 127 in conjunction with an iterative learning control scheme. Specifically, read/write head 127 is moved in one stroke iteration from one edge of surface 112 to the opposite edge of surface 112 for multiple iterations using open loop control (for example, from the ID of surface 112 to the OD of surface 112). That is, read/write head 127 is moved from one edge of surface 112 to the opposite edge of surface 112 by the application of voltage (or alternatively, current) to voice coil motor 128, according to a particular predetermined voltage (or current) profile. Concurrently, an actual velocity profile of read/write head 127 is measured for the stroke iteration by monitoring the back electromotive force (EMF) generated by voice coil motor 128. An iterative learning control scheme then compares the measured velocity profile of read/write head 127 for the stroke iteration to a target velocity profile, and modifies the predetermined voltage (or current) profile to be applied to voice coil motor 128 for the next stroke iteration accordingly.

Figure 4:
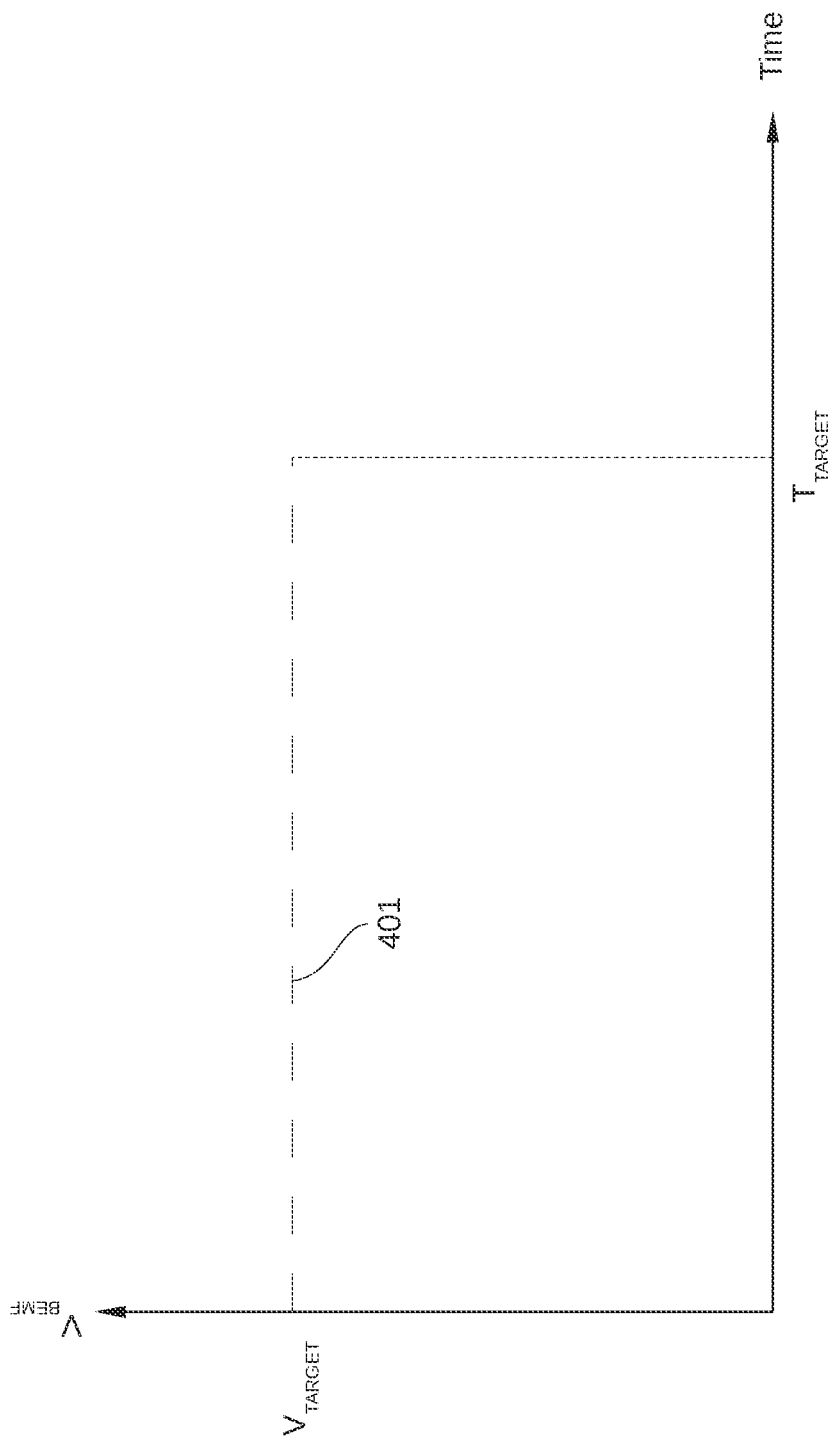
FIG. 4 illustrates a target velocity profile for a read/write head of the hard disk drive of FIG. 1 as the read/write head moves across a disk surface and writes one of the bootstrap spirals in FIG. 3, according to one embodiment.

FIG. 4 illustrates a target velocity profile 401 for read/write head 127 as read/write head 127 moves across surface 112 and writes one of bootstrap spirals 210 in FIG. 3, according to one embodiment. As shown, target velocity profile 401 indicates a constant velocity, i.e., target velocity $V_{TARGET}$. When read/write head 127 is moved across surface 112 at an average velocity that is substantially equal to $V_{TARGET}$, read/write head 127 arrives at unload ramp 123 (located at the OD of storage disk 110) at a target time $T_{TARGET}$. Thus, by writing one of bootstrap spirals 210 as read/write head 127 is moved radially across surface 112 according to target velocity profile 401, the bootstrap spiral 210 so written will extend from the ID of storage disk 110 to the unload ramp 123 of storage disk 110 with a constant slope 220, as shown in FIG. 3. It is noted that the less that the radial velocity of read/write head 127 varies from $V_{TARGET}$ while writing the bootstrap spiral 210, the less that slope 220 varies from a constant value.

It is noted that simply applying constant voltage to voice coil motor 128 will not result in read/write head 127 moving across surface 112 with a constant velocity profile that sufficiently approximates target velocity profile 401. This is due to drive-to-drive manufacturing variations as well as variations in different factors across the stroke of actuator arm assembly 120, such as the torque constant of voice coil motor 128 and aerodynamic resistance ("windage force") against actuator arm assembly 120 and read/write head 127. Instead, a voltage (or current) profile for generating a velocity profile for the radial movement of read/write head 127 that approximates target velocity profile 401 is determined over multiple iterations, via an iterative learning control (ILC) scheme. One embodiment of such an ILC is illustrated in FIG. 5.

Figure 5:
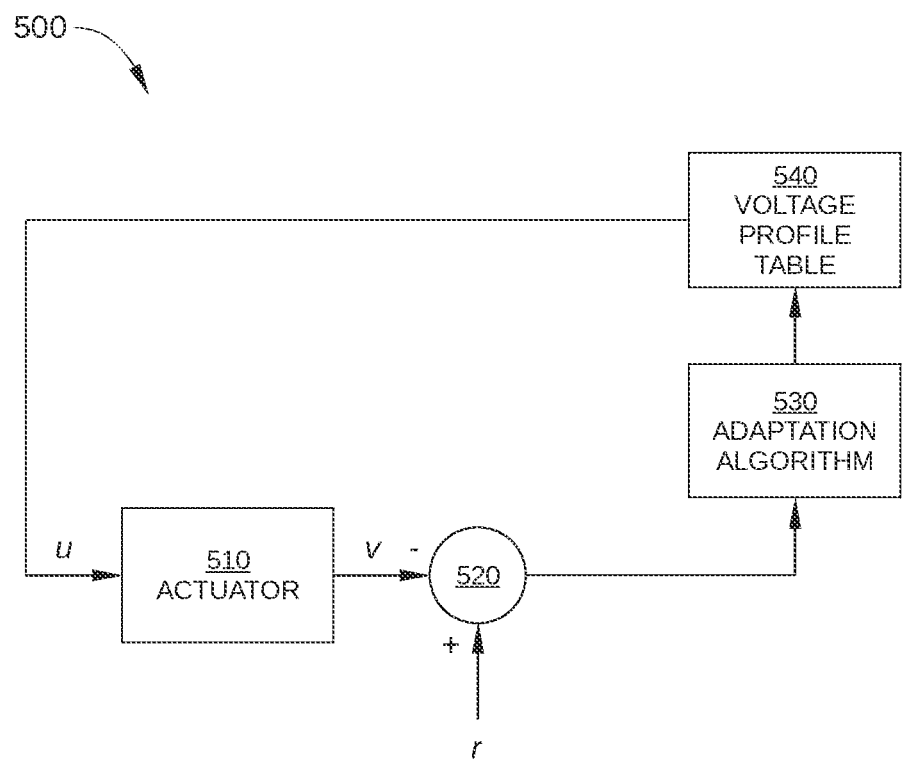
FIG. 5 is a simplified control system block diagram illustrating an iterative learning control scheme, according to some embodiments.

FIG. 5 is a simplified control system block diagram illustrating an ILC scheme 500, according to some embodiments. For one stroke iteration of moving read/write head 127 from one edge of surface 112 to an opposite edge (for example from the ID of surface 112 to the OD of surface 112), ILC 500 repeatedly operates over a series of predefined time intervals ("time steps"). During each such time step, read/write head 127 moves an incremental portion of the stroke across surface 112. Thus, in some embodiments, for each time step that read/write head 127 moves across surface 112, ILC 500 is employed as a discrete process: providing an input (voltage for the time step); receiving an output (measured velocity of read/write head during the time step); and generating an error signal (difference between the measured velocity and a target velocity for that time step). In some embodiments, for each time step ILC 500 may also include: adapting the original input for the time step based on the error signal and storing the adapted input (modified voltage for the time step) for use in the next iteration of moving read/write head 127 from the ID to the OD of surface 112. In other embodiments, ILC 500 may perform the steps of adapting the original input and storing the adapted input for all time steps after completion of the entire stroke iteration.

ILC scheme 500 includes an actuator 510, a summer/subtracter 520, an adaptation algorithm 530, and a voltage (or current) profile table 540. Actuator 510 represents actuator arm assembly 120 and voice coil motor 128 of HDD 100 in FIG. 1, summer/subtracter 520 generates an error signal for a current time step, adaptation algorithm 530 modifies the stored input value for the current time step, and voltage profile table 540 stores the modified input value for the current time step.

In operation, actuator 510 receives an input u that is a voltage stored in voltage profile table 540 and responds accordingly by moving read/write head 127 at a corresponding radial velocity. Summer/subtracter 520 receives an output v, the measured radial velocity of read/write head 127, and generates an error signal e, the difference between output v and a target radial velocity r. In some embodiments, output v is measured using back EMF generated by voice coil motor 128. Based on error signal e, adaptation algorithm 530 adapts the input u stored in voltage profile table 540 for the current time step, so that in the next stroke iteration of moving read/write head 127 an improved velocity profile results. Taken together, the stored values of input u for each time step form a complete voltage profile that causes read/write head 127 to move with a specific radial velocity profile. It is noted that u, v, r, and e are not signals associated with continuous closed-loop feedback, but instead represent a discrete signal for each time step during the movement of read/write head 127 across surface 112.

In some embodiments, adaptation algorithm 530 is configured to adjust input u for all time steps upon completion of one "stroke iteration," i.e., the complete movement of read/write head 127 from the ID to the OD or vice versa. Thus, the voltage profile stored in voltage profile table 540 is determined as a whole. In such embodiments, adaptation algorithm 530 may adjust the "AC" and "DC" portion of the voltage/current profile separately. Correction of the AC portion (i.e. the ID-OD variation of the voltage) ensures that in the next stroke iteration, actuator arm assembly 120 will move at a more constant velocity across the stroke than the previous stroke iteration, and variation from $V_{TARGET}$ is reduced. In this way, spiral slope 220 is improved with each stroke iteration by becoming more constant across the stroke. Correction of the DC portion (i.e. the average voltage across the stroke) ensures that, in the next stroke iteration, actuator arm assembly 120 will move at an average velocity across the stroke that is closer to $V_{TARGET}$ than the previous iteration, so that read/write head 127 reaches unload ramp 123 closer to $T_{TARGET}$ than in previous stroke iterations. To that end, adaptation algorithm 530 may include a filtering process prior to and/or after correcting the AC and DC portions of the voltage profile stored in voltage profile table 540. Furthermore, adaptation algorithm 530 may include any other suitable iterative learning control schemes known in the art for adjusting the AC and DC portions of the voltage profile applied to voice coil motor 128.

Generally, ILC scheme 500 continues performing the above-described stroke iterations and associated modifications to the voltage profile stored in voltage profile table 540 until one or more convergence criteria are met. For example, in some embodiments, logic associated with ILC scheme 500 compares the measured velocity profile with a desired velocity profile, e.g., target velocity profile 401 in FIG. 4. If a measured difference between the measured velocity profile and the desired velocity profile is less than a threshold difference, convergence is indicated and ILC scheme 500 stops.

The measured difference may be based on one or multiple criteria. For example, in some embodiments, the difference is based at least in part on a difference between an average velocity associated with the measured velocity profile and a target average velocity (e.g., target velocity $V_{TARGET}$ in FIG. 4). The average velocity associated with the measured velocity profile may be an average of the complete stroke from ID to OD, or of a particular portion of the stroke, such as the stroke from ID to unload ramp 123. In some embodiments, the difference is based at least in part on a velocity deviation of the measured velocity profile from the target velocity profile. For example, when all of the measured velocity profile (or a predetermined portion of the measured velocity profile) falls within a maximum velocity deviation from the target velocity profile, convergence is indicated and ILC scheme 500 stops. In such embodiments, individual time steps of the measured velocity profile may be used to calculate deviation from corresponding individual time steps of the target velocity profile. In some embodiments, the difference is based at least in part on a maximum time deviation of the measured velocity profile from a target time (such as target time $T_{TARGET}$ in FIG. 4). Thus, when a measured velocity profile results in read/write head 127 reaching unload ramp 123 at a time that is within the maximum time deviation, convergence is indicated and ILC scheme 500 stops. In some embodiments, a combination of two or more of the above criteria must be met before convergence is indicated and ILC scheme 500 stops.

The time steps employed by ILC scheme 500 may be of any suitable duration. In some embodiments, the time steps are generally very short in duration relative to the time required to move read/write head 127 from the ID to the OD (or vice versa) of surface 112; shorter time steps increase computation times but improve accuracy of the final velocity profile generated by ILC scheme 500. For example, in some embodiments, each time step has a duration of a few hundred micro seconds. In some embodiments, all time steps employed by ILC scheme 500 are of equal duration, whereas in other embodiments, one or more groups of the time steps may have a different duration than other time steps.

Figure 6:
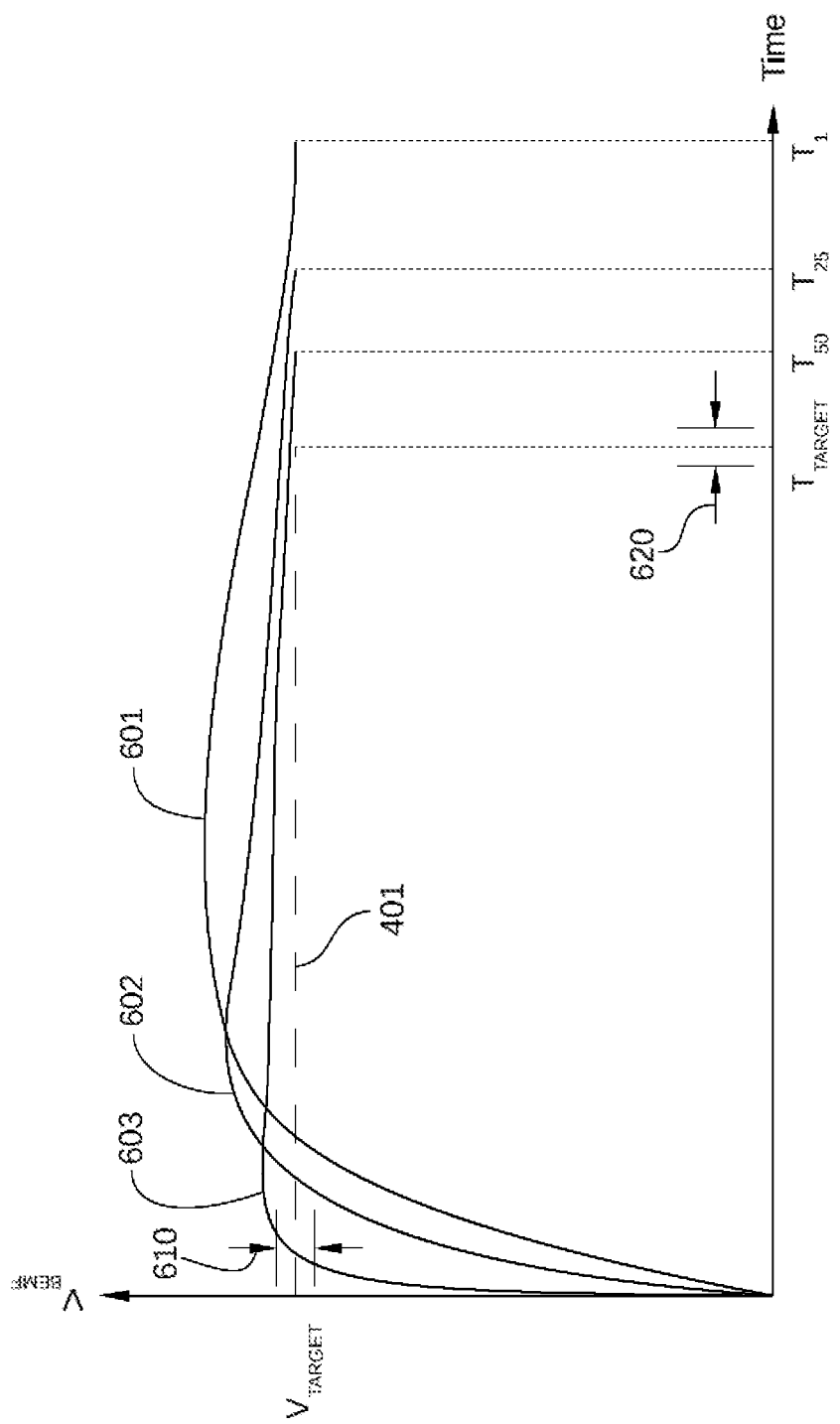
FIG. 6 illustrates a target velocity profile for a read/write head of the hard disk drive of FIG. 1 and multiple measured velocity profiles for the read/write head, according to one embodiment.

FIG. 6 illustrates a target velocity profile 401 for read/write head 127 and multiple measured velocity profiles 601-603 for read/write head 127, according to one embodiment. Target velocity profile 401 is described above in conjunction with FIG. 4. Each of measured velocity profiles 601-603 depicts the velocity measured for one stroke iteration of read/write head 127 moving across surface 112. The velocity at each time step of a particular iteration may be measured by monitoring back EMF voltage of voice coil motor 128. In FIG. 6, each of measured velocity profiles 601-603 is depicted as a continuous curve, but in practice each measured velocity profile is composed of a plurality of discrete points—one point for each time step of that particular stroke iteration of read/write head 127. FIG. 6 also illustrates a maximum velocity deviation 610 and a maximum time deviation 620.

Measured velocity profile 601 illustrates the measured velocity for a first stroke iteration of moving read/write head 127 across surface 112 in response to a particular voltage profile being applied to voice coil motor 128. In some embodiments, the first voltage profile may simply be a constant voltage known to cause voice coil motor to move read/write head 127 at a radial velocity that roughly approximates target velocity $V_{TARGET}$. In other embodiments, the first voltage profile may be a voltage profile based on the final voltage profile determined for an HDD that is substantially similar to HDD 100, or on an average of such final voltage profiles for a plurality of such HDDs. Thus, previously determined voltage profiles for similar HDDs may be employed as an initial "best guess" that may reduce the total number of stroke iterations for convergence of ILC scheme 500. A ramp contact time $T_1$ is associated with measured velocity profile 601 and indicates the time required for read/write head 127 to contact unload ramp 123 when moved according to measured velocity profile 601. As shown, ramp contact time $T_1$ is substantially greater than (or in other situations significantly less than) target time $T_{TARGET}$.

Measured velocity profile 602 illustrates the measured velocity for the 25th stroke iteration and measured velocity profile 603 the measured velocity for the 50th stroke iteration. As shown, as more stroke iterations are performed, the voltage profile stored in voltage profile table 540 is adapted to move read/write head 127 with a velocity profile that more closely matches target velocity profile 401. The number of iterations required before convergence is indicated may vary based on multiple factors, including the initial voltage profile used to generate measured velocity profile 601, the duration of the time steps making up each stroke iteration, the magnitude of maximum velocity deviation 610 and maximum time deviation 620, specific parameters of adaptation algorithm 530, and the like. A ramp contact time $T_{25}$ is associated with measured velocity profile 602 and indicates the time required for read/write head 127 to contact unload ramp 123 when moved according to measured velocity profile 602. Similarly, a ramp contact time $T_{50}$ is associated with measured velocity profile 603 and indicates the time required for read/write head 127 to contact unload ramp 123 when moved according to measured velocity profile 603. As shown, ramp contact times approach target time $T_{TARGET}$ as more stroke iterations are performed.

Figure 7:
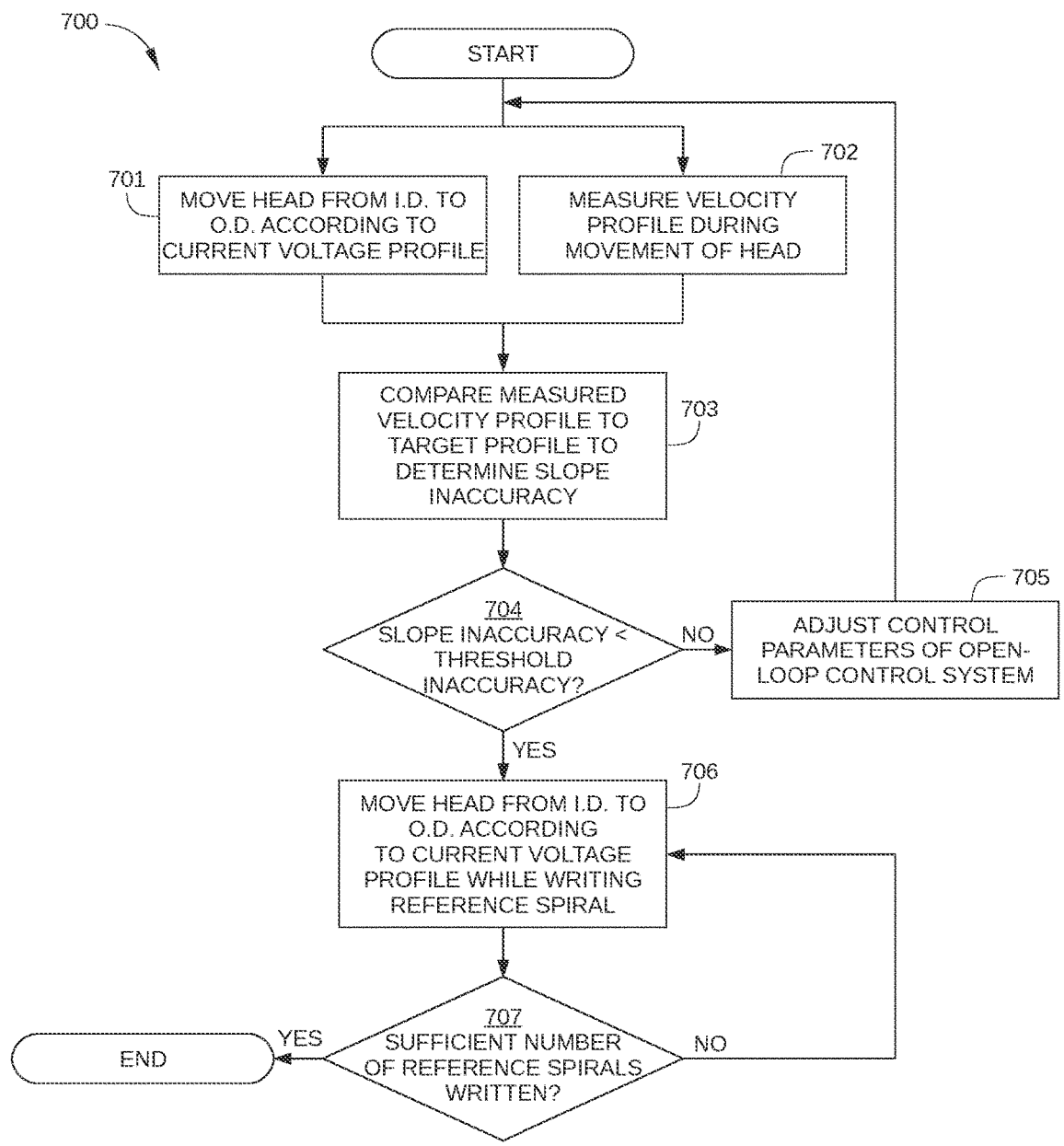
FIG. 7 sets forth a flowchart of method steps for writing a servo spiral on a recording surface of a magnetic storage disk, according to an embodiment.

FIG. 7 sets forth a flowchart of method steps for writing a servo spiral on a recording surface of a magnetic storage disk, according to an embodiment. Although the method steps are described in conjunction with HDD 100 in FIGS. 1-6, persons skilled in the art will understand that the method steps may be performed with other types of systems. The control algorithms for the method steps may reside in microprocessor-based controller 133, or, in some embodiments, an external host device that is temporarily coupled to HDD 100 and used to facilitate the calibration of HDD 100. For clarity of description, controller 133 is assumed to perform said control algorithms for the method steps, although other external control devices can potentially be used in such a role.

In some embodiments, prior to the method steps, HDD 100 may undergo a warm-up process to minimize or otherwise reduce temperature-based transients in HDD 100 that may affect the ILC scheme used to determine a voltage profile for writing a servo spiral. In such embodiments, HDD 100 may operate until such time that thermal equilibrium is reached substantially throughout the drive. Alternatively, HDD 100 may operate for a shorter time period during which the drive is not at thermal equilibrium when the method steps begin, but is partially warmed up. In such embodiments, the voltage profile determined by ILC scheme will have little or no degradation in accuracy if thermal equilibrium in HDD 100 is substantially achieved when the final stroke iterations are performed.

As shown, method 700 begins at step 701, when microprocessor-based controller 133 moves read/write head 127 from the ID of surface 112, for example from ID crash stop 129, to the OD of surface 112. Read/write head 127 is moved using open-loop control according to the current voltage profile stored in voltage profile table 540. For example, for each of a plurality of predetermined time steps, a voltage taken from the voltage profile and corresponding to that time step is applied for the duration of the time step to voice coil motor 128. In addition, write current is not enabled in step 701, since the final velocity profile for read/write head 127 has not yet been determined. Furthermore, in some embodiments, dynamic fly-height control is disabled during step 701, so that read/write head 127 is less likely to be damaged by crashing into surface 112 of disk 110 if read/write head 127 contacts unload ramp 123 at a suboptimal velocity.

Concurrent with step 701, in step 702, microprocessor-based controller 133 measures the velocity profile of read/write head 127 during step 701, for example by monitoring back EMF for each of the plurality of time steps until read/write head 127 reaches the OD of surface 112. In step 703, microprocessor-based controller 133 compares the measured velocity profile constructed in step 702 to a target velocity profile, e.g., target velocity profile 401 in FIG. 4, to determine a slope inaccuracy. The slope inaccuracy may be based on one or more quantitative measures, including: a difference between the average slope of the measured velocity profile and the average slope of the target velocity profile; a difference between a ramp contact time associated with the measured velocity profile and a target time; and a velocity deviation of the measured velocity profile from the target velocity profile.

In step 704, microprocessor-based controller 133 determines whether the slope inaccuracy determined in step 703 is less than a threshold accuracy, such as a maximum allowable time deviation, a maximum allowable velocity deviation, and/or a maximum allowable average slope. If yes, method 700 proceeds to step 705; if no, method 700 proceeds to step 705. In step 705, microprocessor-based controller 133 adjusts control parameters of the open-loop control system based on the error between the measured velocity profile and the target velocity profile. For example, adaptation algorithm 530 may adjust the AC and DC portions of the voltage profile used to generate the measured velocity profile measured in step 702. Method 705 then proceeds back to steps 701 and 702, in which another stroke iteration is performed.

In step 706, in response to the slope inaccuracy determined in step 703 being less than the threshold accuracy, microprocessor-based controller 133 moves read/write head 127 across surface 112 (for example from ID to OD) according to the most recently determined voltage profile, i.e., the voltage profile used to move read/write head 127 in step 701. In addition, microprocessor-based controller 133 enables dynamic fly height control and write current, so that read/write head 127 writes a bootstrap spiral 210 on storage disk 110. In step 707, microprocessor-based controller 133 determines whether a sufficient number of bootstrap spirals 210 have been written on disk 110. If no, method 700 proceeds back to step 706 to write an additional bootstrap spiral 210; if yes, method 700 ends.

Thus, method 700 enables one or more bootstrap spirals 210 that have constant and uniform slope 220 to be written on disk 110 without previously written timing and position information. Appropriate selection of convergence criteria can ensure that the bootstrap spirals 210 have sufficient accuracy of placement that the servo system of HDD 100 can subsequently perform closed-loop tracking of these bootstrap spirals 210 to write servo spirals that are accurate enough for writing servo wedges.

In some embodiments, closed-loop control of the position of read/write head 127 is used when read/write head 127 moves onto unload ramp 123. In this way, read/write head 127 can be moved onto unload ramp 123 at a safe radial velocity, thereby avoiding the possibility of read/write head 127 being moved onto unload ramp 123 at a dangerously low velocity, which may occur if open-loop control is used. In such embodiments, read/write head 127 is initially moved from the ID toward unload ramp 123 using open-loop control, as described above. At a predetermined switchover point, closed-loop control is initiated, using back EMF voltage as velocity feedback, and read/write head 127 is moved into contact with and then onto unload ramp 123 using such closed-loop control. In some embodiments, ramp detection is facilitated by feedback associated with such closed-loop control, as is illustrated in FIG. 8.

Figure 8:
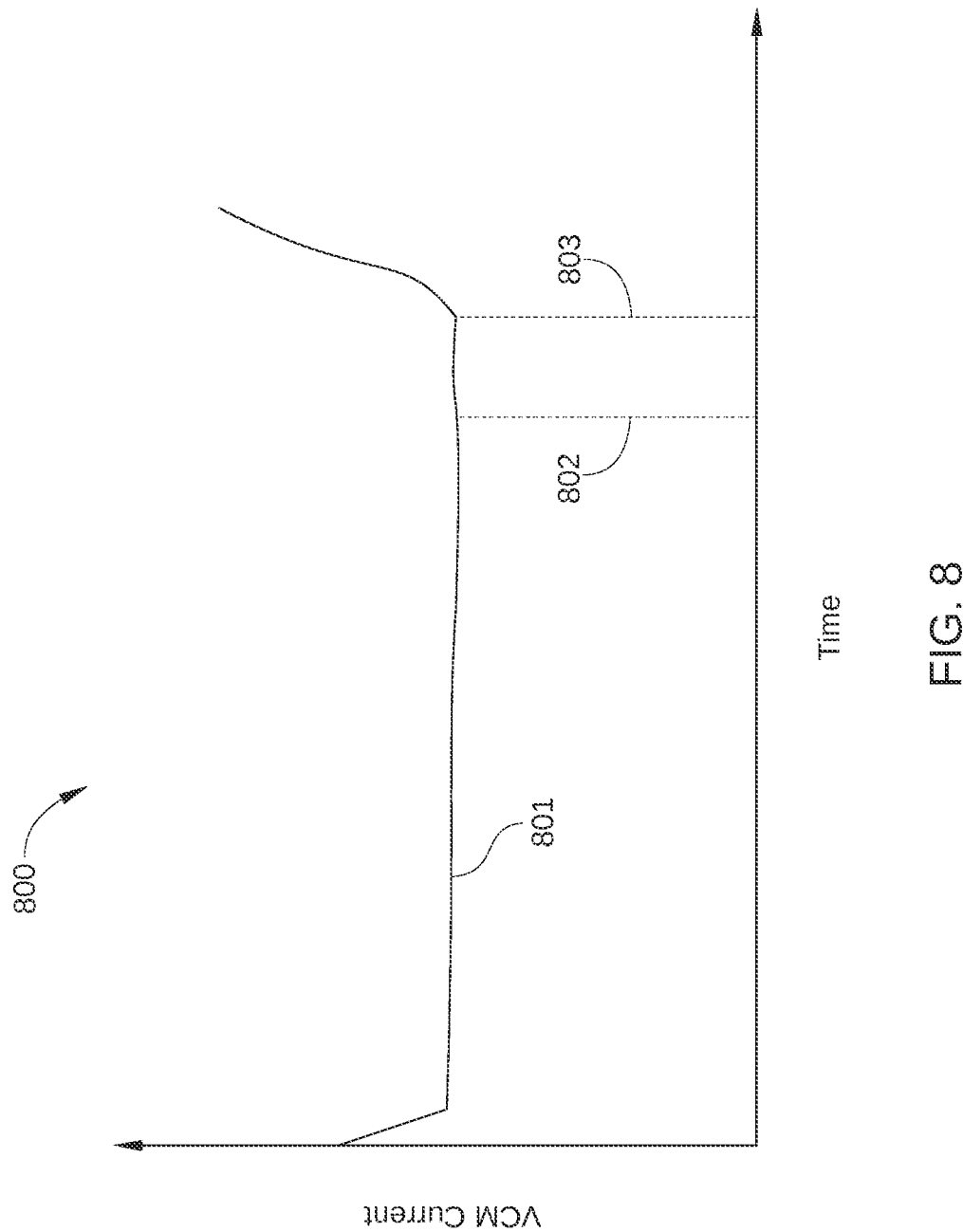
FIG. 8 illustrates a current profile that may be used to detect contact with an unload ramp by an actuator arm assembly of the hard disk drive of FIG. 1, according to an embodiment.

FIG. 8 illustrates a current profile 800 that may be used to detect contact with unload ramp 123 by actuator arm assembly 120, according to an embodiment. Current profile 800 shows back EMF current 801 generated by voice coil motor 128 as read/write head 127 is moved radially across disk 110 during one stroke iteration. As shown, back EMF current 801 remains substantially constant as read/write head 127 is moved from the ID of surface 112 toward the OD of surface 112. At a switchover point 802, open-loop control of actuator arm assembly 120 ends and closed-loop control of actuator assembly 120 begins, using back EMF voltage as velocity feedback. Read/write head 127 continues to move radially across disk 110 at a substantially constant radial velocity, therefore back EMF current 801 remains substantially constant. However, once actuator arm assembly 120 contacts unload ramp 123 at a contact time 803, the current generated increases steeply, since more power is applied to voice coil motor 128 to overcome ramp friction forces and maintain a specific velocity. Thus, the point in time (i.e. contact time 803) during the stroke of actuator arm assembly 120 at which ramp contact occurs is readily detected.

Because open-loop control based on a well-adapted voltage profile can generate a more accurate velocity profile for read/write head 127 than closed-loop control using back EMF voltage, open-loop control is preferred for writing bootstrap spirals 210. In some embodiments, to maximize the portion of the stroke of actuator arm assembly 120 that is controlled via open-loop control, the point in time at which open-loop control is changed to closed-loop control occurs, i.e., switchover point 802, is modified based on the detection of ramp contact as illustrated in FIG. 8. One such embodiment is described in conjunction with FIG. 9.

Figure 9:
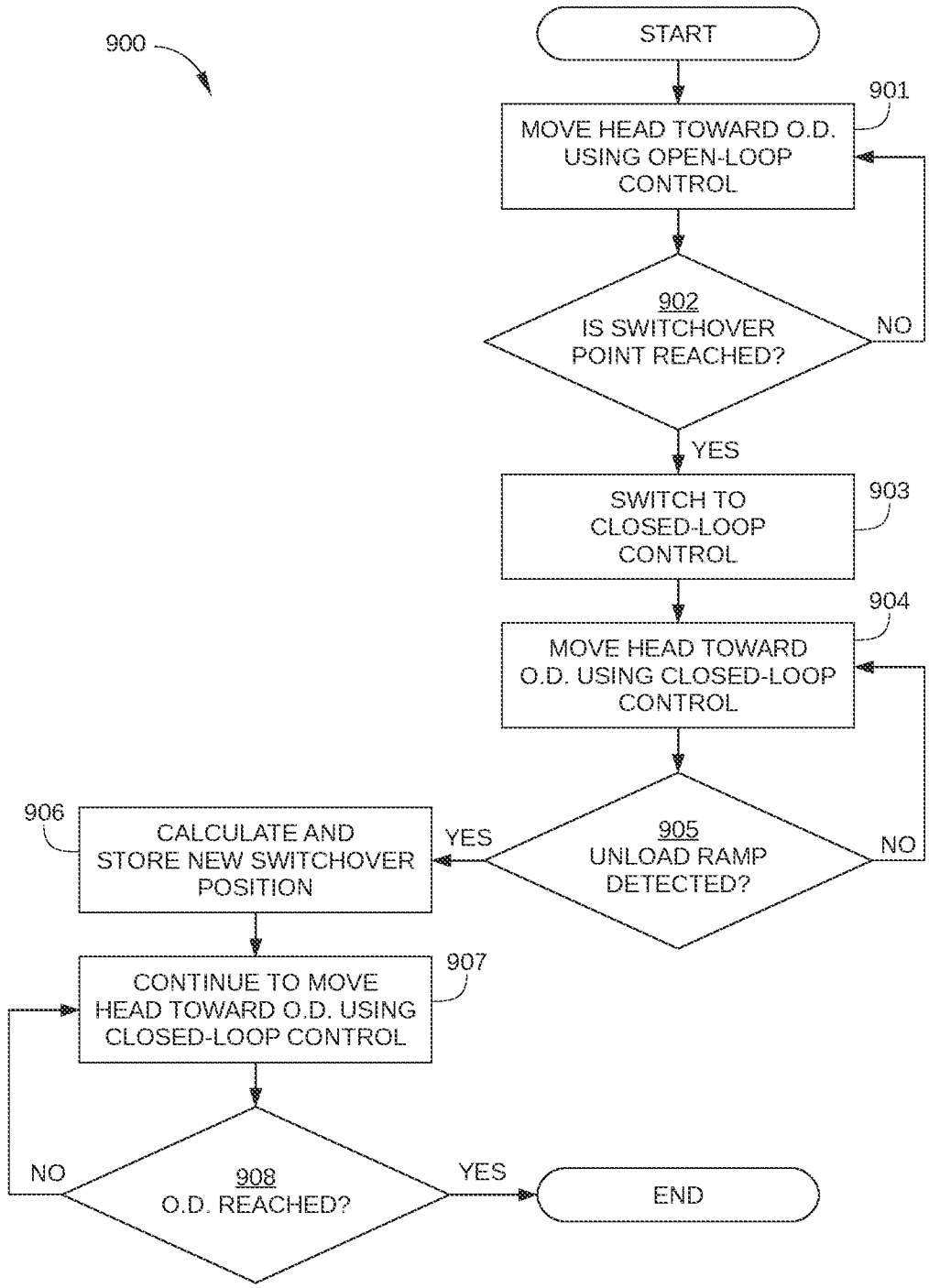
FIG. 9 sets forth a flowchart of method steps for switching between open-loop and closed-loop control of the position of a read/write head during a stroke iteration, according to an embodiment.

FIG. 9 sets forth a flowchart of method steps for switching between open-loop and closed-loop control of the position of read/write head 127 during a stroke iteration, according to an embodiment. Although the method steps are described in conjunction with HDD 100 in FIGS. 1-8, persons skilled in the art will understand that the method steps may be performed with other types of systems. The control algorithms for the method steps may reside in microprocessor-based controller 133, or, in some embodiments, an external host device that is temporarily coupled to HDD 100 and used to facilitate the calibration of HDD 100. For clarity of description, controller 133 is assumed to perform said control algorithms for method 900, although other external control devices can potentially be used in such a role.

It is noted that the method steps may be performed as part of step 701 of method 700 and result in one complete stroke iteration of read/write head 127 from ID to OD. Prior to the method steps, a switchover point is calculated and stored. Initially, the switchover point is selected to occur at a location along the stroke of actuator arm assembly 120 with a significant safety margin from unload ramp 123. In this way, the initial positional inaccuracies associated with using open-loop control cannot result in read/write head 127 being moved onto unload ramp 123 prior to the switchover point.

As shown, method 900 begins at step 901, when microprocessor-based controller 133 moves read/write head 127 from the ID of surface 112 to the OD of surface 112 using open-loop control based on a predetermined voltage profile. In step 902, microprocessor-based controller 133 determines whether a switchover point has been reached. If no, method 900 proceeds back to step 901; if yes, method 900 proceeds to step 903. In step 903, microprocessor-based controller 133 switches from open-loop control to closed-loop control of the position of read/write head 127. In step 904, microprocessor-based controller 133 continues to move read/write head 127 toward the OD of surface 112 using closed-loop control, i.e., using back EMF voltage as a velocity feedback signal. In step 905, microprocessor-based controlled 133 determines whether unload ramp 123 has been detected. If no, method 900 proceeds back to step 904; if yes, method 900 proceeds to step 906. In step 906, microprocessor-based controller 133 calculates and stores the new switchover point, which is based on the detected location of unload ramp 123. The new switchover location can be used in subsequent stroke iterations, and can be used to safely increase the portion of the stroke in which open-loop control is employed. In step 907, microprocessor-based controller 133 continues to move read/write head 127 toward the OD of surface 112. In step 908, microprocessor-based controller 133 determines whether the OD of surface 112 has been reached. If no, method 900 proceeds back to step 907; if yes, method 900 ends.

In sum, embodiments described herein provide systems and methods for writing reference spiral on a recording surface of a magnetic storage disk, when the surface is free of position or timing information. Reference spirals are written on the recording surface with a substantially uniform slope by using open loop control of the position of a read/write head in conjunction with an iterative learning control scheme. A voltage profile applied to a voice coil motor is adapted over multiple iterations of moving the read/write head across the recording surface to closely approximate a target voltage profile, and the reference spiral is written using the adapted voltage profile. In addition, ramp contact detection based on actuator current profile may be employed to achieve full utilization of available actuator stroke.

While the foregoing is directed to embodiments of the present invention, other and further embodiments of the invention may be devised without departing from the basic scope thereof, and the scope thereof is determined by the claims that follow.

We claim:

1. A method of writing a servo spiral on a recording surface of a magnetic storage disk, the method comprising:
   controlling a write head according to a first velocity profile using open-loop control to move the write head from an inner diameter of the recording surface to an outer diameter of the recording surface;
   measuring a second velocity profile of the write head while the write head is moved from the inner diameter to the outer diameter;
   adjusting control parameters of the open-loop control to move the write head from the inner diameter of the recording surface to the outer diameter of the recording surface according to the second velocity profile;
   writing a servo spiral on the recording surface as the write head is moved from the inner diameter of the recording surface to the outer diameter of the recording surface according to the adjusted control parameters; and
   controlling the write head using closed loop control to move an actuator arm coupled to the write head onto the unload ramp when the write head is disposed at the outer diameter.

2. The method of claim 1, further comprising:
   comparing the second velocity profile with a desired velocity profile; and
   determining that a difference between the second velocity profile and the desired velocity profile is less than a threshold difference.

3. The method of claim 2, wherein the difference between the second velocity profile and the desired velocity profile is based at least in part on a difference between an average velocity associated with the second velocity profile and a target average velocity associated with the target velocity profile.

4. The method of claim 3, wherein moving the write head from the inner diameter to the outer diameter at the target average velocity results in an actuator arm coupled to the write head contacting an unload ramp at a target time.

5. The method of claim 2, wherein the difference between the second velocity profile and the desired velocity profile is based at least in part on a variance in velocity associated with the second velocity profile and a maximum velocity deviation associated with the target velocity profile.

6. The method of claim 2, wherein the difference between the second velocity profile and the desired velocity profile is based at least in part on a maximum time difference from a target time.

7. The method of claim 1, further comprising:
   comparing the first velocity profile with the desired velocity profile;
   determining that a difference between the first velocity profile and the desired velocity profile is greater than a threshold difference; and
   adjusting control parameters of the open-loop control to move the write head according to the second velocity profile by modifying a previous configuration of control parameters of the open-loop control.

8. The method of claim 1, wherein measuring the second velocity profile of the write head comprises monitoring a back electromotive force associated with moving the write head from the inner diameter to the outer diameter.

9. The method of claim 8, wherein measuring the second velocity profile of the write head further comprises determining a radial velocity of the write head at a plurality of times while the head is being moved from the inner diameter to the outer diameter.

10. The method of claim 1, wherein the closed loop control is configured to measure velocity based on a back electromotive force associated with moving the write head.

11. A data storage device comprising:
a data storage disk with a recording surface; and
a controller configured to:
control a write head according to a first velocity profile using open-loop control to move the write head from an inner diameter of the recording surface to an outer diameter of the recording surface;
measure a second velocity profile of the write head while the write head is moved from the inner diameter to the outer diameter;
adjust control parameters of the open-loop control to move the write head from the inner diameter of the recording surface to the outer diameter of the recording surface according to the second velocity profile;
write a servo spiral on the recording surface as the write head is moved from the inner diameter of the recording surface to the outer diameter of the recording surface according to the adjusted control parameters; and
control the write head using closed loop control to move an actuator arm coupled to the write head onto an unload ramp when the write head is disposed at the outer diameter.

12. The data storage device of claim 11, wherein the controller is further configured to:
compare the second velocity profile with a desired velocity profile; and
determine that a difference between the second velocity profile and the desired velocity profile is less than a threshold difference.

13. The method of claim 12, wherein the difference between the second velocity profile and the desired velocity profile is based at least in part on a difference between an average velocity associated with the second velocity profile and a target average velocity associated with the target velocity profile.

14. The method of claim 13, wherein moving the write head from the inner diameter to the outer diameter at the target average velocity results in an actuator arm coupled to the write head contacting an unload ramp at a target time.

15. The data storage device of claim 11, wherein the controller is further configured to:
compare the first velocity profile with the desired velocity profile;
determine that a difference between the first velocity profile and the desired velocity profile is greater than a threshold difference; and
adjust control parameters of the open-loop control to move the write head according to the second velocity profile by modifying a previous configuration of control parameters of the open-loop control.

16. The data storage device of claim 11, wherein measuring the second velocity profile of the write head comprises monitoring a back electromotive force associated with moving the write head from the inner diameter to the outer diameter.

17. The data storage device of claim 16, wherein measuring the second velocity profile of the write head further comprises determining a radial velocity of the write head at a plurality of times while the head is being moved from the inner diameter to the outer diameter.

18. The data storage device of claim 11, wherein the closed loop control is configured to measure velocity based on a back electromotive force associated with moving the write head.

19. A data storage device comprising:
a data storage disk with a recording surface; and
a controller configured to:
control a write head according to a first velocity profile using open-loop control to move the write head from an inner diameter of the recording surface to an outer diameter of the recording surface;
measure a second velocity profile of the write head while the write head is moved from the inner diameter to the outer diameter;
adjust control parameters of the open-loop control to move the write head from the inner diameter of the recording surface to the outer diameter of the recording surface according to the second velocity profile;
write a servo spiral on the recording surface as the write head is moved from the inner diameter of the recording surface to the outer diameter of the recording surface according to the adjusted control parameters; and
change control of the write head from open-loop control to closed-loop control as the write head is moved from the inner diameter to the outer diameter.

20. The data storage device of claim 19, wherein a radial location where the change from the open-loop control to the closed-loop control occurs is recorded.

21. The data storage device of claim 20, wherein a radial location where the change from the open-loop control to the closed-loop control occurs is determined based on a previously recorded radial location.

* * * * *